United States Patent [19]
Burg et al.

[11] 4,169,867
[45] Oct. 2, 1979

[54] MOLDING COMPOSITIONS BASED ON OXYMETHYLENE POLYMERS

[75] Inventors: Karlheinz Burg, Naurod; Günther Kirsch, Frankfurt am Main, both of Fed. Rep. of Germany

[73] Assignee: Hoechst Aktiengesellschaft, Frankfurt am Main, Fed. Rep. of Germany

[21] Appl. No.: 622,502

[22] Filed: Oct. 15, 1975

[30] Foreign Application Priority Data

Oct. 17, 1974 [DE] Fed. Rep. of Germany ....... 2449343

[51] Int. Cl.[2] ...................... C08L 63/00; C08L 67/00; C08L 67/06
[52] U.S. Cl. ................................................... 525/417
[58] Field of Search ................ 260/867, 873, 835, 860

[56] References Cited

U.S. PATENT DOCUMENTS

| 2,460,181 | 1/1949 | Marshall | 260/873 |
| 3,053,792 | 9/1962 | Ikeda | 260/873 |
| 3,595,937 | 7/1971 | Weissermel et al. | 260/860 |
| 3,651,014 | 3/1972 | Witsiepe | 260/873 |
| 3,980,734 | 9/1976 | Burg et al. | 260/860 |

*Primary Examiner*—J. Ziegler
*Attorney, Agent, or Firm*—Curtis, Morris & Safford

[57] ABSTRACT

A thermoplastic molding composition being a suitable material for technical purposes comprises a mixture of an oxymethylene polymer and of an elastomeric copolyester having short-chain and long-chain diol elements as well. The molding composition is prepared by mixing and homogenizing the components and may contain usual additives, especially stabilizers.

8 Claims, No Drawings

MOLDING COMPOSITIONS BASED ON OXYMETHYLENE POLYMERS

Thermoplastic molding compositions based on oxymethylene polymers, i.e. oxymethylene homopolymers and oxymethylene copolymers, have been known for a long time as a material especially suitable for technical purposes. Also known are mixtures of oxymethylene polymers with polyester from linear aliphatic dicarboxylic acids and α, ω-diols; the addition of polyester to the polyacetals improves their impact strength (of. U.S. Pat. No. 3,795,715). It is further known that an addition of polyacetals improves the properties of thermoplastic molding compositions based on polyester; for this purpose linear, saturated polyesters of aromatic dicarboxylic acids, e.g. poly(ethylene-glycol) terephthalate) have been used (of. U.S. Pat. No. 3,595,937).

The present invention provides a thermoplastic molding composition consisting of a mixture of
 (A) from 99.9 to 50 weight % of an oxymethylene polymer containing optionally from 0.1 to 20 weight % of oxyalkylene units having in the main chain from 2 to 8 adjacent carbon atoms, and
 (B) from 0.1 to 50 weight % of a copolyester composed of
  (a) from 75 to 35 weight % of units of an ester of at least one aromatic dicarboxylic acid having a molecular weight of at most 300 and a diol having a molecular weight of from 350 to 8,000 and
  (b) from 25 to 65 weight % of units of an ester composed of at least one aromatic dicarboxylic acid having a molecular weight of at most 300 and a diol having a molecular weight of at most 250.

The portion of oxymethylene polymer which is used as component (A) amounts preferably from 99.5 to 80 weight %, whilst the portion of component (B) is preferably from 0.5 to 20 weight %. Especially good results are obtained with a mixture containing from 99 to 90 weight % of component (A) and from 1 to 10 weight % of component (B).

Homopolymers of formaldehyde or trioxane-copolymers having preferably a linear structure, are used as oxymethylene polymers (component A) of the molding composition according to the invention.

By homopolymers of formaldehyde or trioxane are to be understood those formaldehyde or trioxane homopolymers, the hydroxyl terminal groups of which are stabilized against degradation by chemical reaction, e.g. by esterification or by etherification. By trioxane-copolymers are to be understood copolymers of trioxane and cyclic ethers, cyclic acetals and/or linear polyacetals which have primary alcohol terminal groups.

Comonomers for trioxane are
 (a) cyclic ethers having 3, 4 or 5, preferably 3 ring members, or
 (b) cyclic acetals other than trioxane having from 5 to 11, preferably 5, 6, 7 or 8 ring members, and
 (c) linear polyacetals, in an amount of from 0.1 to 20, preferably from 0.5 to 10 weight % each.

Most suitable are copolymers of from 99 to 95 weight % of trioxane and from 1 to 5 weight % of one of said cocomponents.

Especially suitable comonomers for trioxane are compounds of formula I

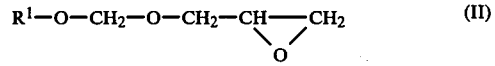

wherein R represents a hydrogen atom, an alkyl radical having from 1 to 6, preferably 1, 2 or 3 carbon atoms which may be substituted by 1, 2 or 3 halogen atoms, preferably by chlorine atoms, an alkoxymethyl radical having from 2 to 6, preferably 2, 3 or 4 carbon atoms, a phenyl radical or a phenoxymethyl radical, x being 1, 2 or 3 (whereby y is zero), y being 1, 2 or 3 (whereby x being zero and z being 2) and z being 3, 4, 5 or 6 (whereby x being zero and y being 1).

Especially suitable cyclic ethers are epoxides, e.g. ethylene oxide, styrene oxide, propylene oxide and epichlorhydrin as well as phenylglycidyl ether.

Suitable cyclic acetals are especially cyclic formals of aliphatic or cycloaliphatic α, ω-diols having from 2 to 8, preferably 2, 3 or 4 carbon atoms, the carbon chain of which may be interrupted in intervals of two carbon atoms by an oxygen atom, e.g. glycolformal(1,3-dioxolane), propanediol formal (1,3-dioxane), butanediol formal (1,3-dioxepane) and diglycol formal (1,3,6-trioxocane) as well as 4-chloromethyl-1,3-dioxolane, hexanediol formal (1,3-dioxonane) and butenediol formal (1,3-dioxacycloheptene-(5)).

Suitable linear polyacetals are homopolymers or copolymers of the above specified cyclic acetals and also linear condensates of aliphatic or cycloaliphatic α, ω-diols with aliphatic aldehydes, preferably formaldehyde. Preference is given to the use of homopolymers of cyclic formals of aliphatic α, ω-diols having from 2 to 8, preferably 2, 3 or 4 carbon atoms, for example poly(1,3-dioxolane), poly(1,3-dioxane) and poly(1,3-dioxepane).

As additional comonomers for trioxane are optionally employed further compounds with several polymerizable groups in the molecule, e.g. alkyl glycidyl formals, polyglycol diglycidyl ether, alkanediol glycidyl ether or bis-(alkanetriol)-triformals, in an amount of from 0.05 to 5, preferably from 0.1 to 2 weight %, calculated on the total quantity of monomers.

By alkyl glycidyl formals are to be understood compounds of formula (II)

$$R^1-O-CH_2-O-CH_2-CH\underset{O}{\overset{}{-\!\!\!-\!\!\!-}}CH_2 \quad (II)$$

wherein $R^1$ represents an aliphatic alkyl radical having from 1 to 10, preferably from 1 to 5 carbon atoms. Especially suitable are alkylglycidyl formals of the above mentioned formula with linear, saturated, aliphatic alkyl radicals, e.g. methylglycidyl formal, ethylglycidyl formal, propylglycidyl formal and butylglycidyl formal.

Polyglycol diglycidyl ethers are compounds of formula (III)

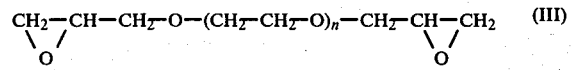

wherein n represents an integer from 2 to 5. Especially suitable are polyglycoldiglycidyl ethers of the afore mentioned formula, wherein n represents 2 or 3, e.g.

diethylene glycol diglycidyl ether and triethylene glycol diclycidyl ether.

Alkanediol diglycidyl ethers are compounds of formula (IV)

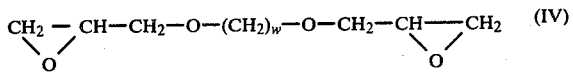

wherein w represents an integer from 2 to 6, preferably 2, 3 or 4. Especially suitable is butanediol diglycidyl ether.

By bis(alkanetriol)-triformals are to be understood compounds with one linear and two cyclic formal groups, especially compounds of formula (V)

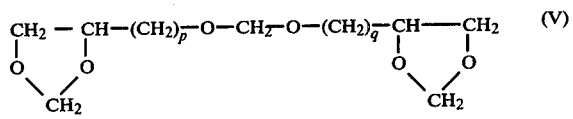

wherein p and q represent each an integer from 3 to 9, preferably 3 or 4. Especially suitable are symmetric bis(alkane-triol)-triformals of the afore mentioned formula, in which p and q means the same integer, e.g. bis(1,2,5-pentanetriol)-tri-formal and preferably bis(1,2,6-hexanetriol)-triformal.

The values for the reduced specific viscosity (RSV-values) of the oxymethylene polymers according to the invention (measured on a solution of the polymer in butyrolactone containing 2 weight % of diphenylamine, at 140° C. at a concentration of 0.5 g/100 ml) are from 0.07 to 2.50 dl.g$^{-1}$, preferably from 0.14 to 1.20 dl.g$^{-1}$. The crystallite melting points of the oxymethylene polymers are from 140° to 180° C., preferably from 150° to 170° C., their densities vary from 1.38 to 1.45 g.ml$^{-1}$, preferably from 1.40 to 1.43 g.ml$^{-1}$ (measured according to DIN 53 479).

The trioxane-copolymers used according to the invention, being preferably binary or tertiary, are prepared in known manner by polymerizing the monomers in the presence of cationically active catalysts at temperatures from zero to 100° C., preferably from 50° to 90° C. (cf. e.g. U.S. Pat. No. 3,027,352). As catalysts are preferably used, for example, Lewis acids, e.g. boron trifluoride and antimony pentafluoride, and complex compounds of Lewis acids, preferably etherates, e.g. boron trifluoride-diethyletherate and boron trifluoride-ditert.-butyl-etherate. Also suitable are protonic acids, e.g. perchloric acid, as well as salt-like compounds, e.g. triphenylmethyl hexafluorophosphate, triethyloxonium tetrafluoroborate or acetylperchlorate. The polymerization may be carried out in bulk, in suspension or in solution. For eliminating unstable portions, the copolymers are usefully submitted to a thermally or hydrolytically controlled partial degradation to obtain primary alcohol terminal groups (cf. U.S. Pat. Nos. 3,103,499 and 3,219,623).

The homopolymers of formaldehyde or of trioxane used according to the invention are also prepared in known manner by catalytic polymerization of the monomer (cf. e.g. U.S. Pat. Nos. 2,768,994; 2,982,758 and 2,989,505).

Copolyesters representing segmented thermoplastic elastomers and composed of (a) long-chain ester units and (b) short-chain ester units which are connected to each other by means of ester linkage in head-tail-combination, are used as component (B) of the molding composition according to the invention. The portion of the long-chain ester units amounts preferably to from 70 to 50 weight % and that of the short-chain ester units is preferably from 30 to 50 weight %. The ester units occur in the copolyester macromolecules in random distribution.

Aromatic dicarboxylic acids, with molecular weights of at most 300, preferably of from 166 to 250, act as acid components as well of the long-chain as of the short-chain ester units. Especially suitable are aromatic dicarboxylic acids having from 8 to 16, preferably from 8 to 12 carbon atoms. As examples are cited the phenylene dicarboxylic acids terephthalic acid and isophthalic acid as well as naphthalene-1,5-dicarboxylic acid, naphthalene-2-6-dicarboxylic acid, naphthalene-2,7-dicarboxylic acid, 4,4'-dicarboxy-diphenyl, bis(4-carboxyphenyl)-methane, bis(4-carboxyphenyl)-ethane, bis(4-carboxyphenyl)-ether, bis(4-carboxyphenyl)-sulphone, 1,2-bis(4-carboxyphenyl)-ethane, 1,2-bis(4-carboxyphenyl)-ethane, anthrcene-5,10-dicarboxylic acid, anthracene-1,4-dicarboxylic acid, anthracene-1,5-dicarboxylic acid and anthracene-2,6-dicarboxylic acid. The afore mentioned free acids may be replaced also by the corresponding halides, preferably chlorides, or by esters with lower alcohols, preferably by dimethyl ester. The dicarboxylic acids or their derivatives are used either alone or as a mixture, preferably as a mixture of terephthalic acid and isophthalic acid. The long-chain ester units contain as alcohol component diols having a molecular weight of from 350 to 8,000, preferably from 600 to 6,000 (numerical average). Especially suitable are homopolymers, copolymers and block copolymers, which contain terminal hydroxyl groups, of alkylene oxides having in the nucleus from 2 to 9, preferably 2, 3, 4 or 5 carbon atoms, e.g. poly(ethylene oxide), poly(propylene oxide), poly(butylene-1,2-oxide), polyoxetane, polyoxolane, polyoxane, polyoxepane, polyoxocane and polyoxonane as well as ethylene oxide/propylene oxide-copolymers, ethylene oxide/oxolane-copolymers and ethylene oxide/propylene oxide-block copolymers. Also suitable are linear polyformals with terminal hydroxyl groups which are prepared by reaction of formaldehyde with one or several aliphatic diols having from 2 to 9 preferably 2, 3, 4 or 5 carbon atoms, e.g. ethylene glycol polyformal, diethylene glycol polyformal, propanediol-(1,3)-polyformal, butanediol-(1,2)-polyformal, propanediol-(1,2)-polyformal, butanediol-(1,4)-polyformal, pentanediol-(1,5)-polyformal, and hexanediol-(1,6)-polyformal. The alcohol component may also consist in a mixture of several of the afore cited diols.

The short-chain ester units contain as alcohol component diols with molecular weights of at most 250, preferably of from 64 to 150. Especially suitable are aliphatic diols having from 2 to 15, preferably from 2 to 8 carbon atoms, e.g. ethylene glycol, diethylene glycol, propanediol-(1,2), propanediol-(1,3), 2,2-dimethyl propanediol-(1,3), butanediol-(1,4), pentanediol-(1,5), hexanediol-(1,6), decanediol-(1,10), 1,4-di-hydroxymethyl-cyclohexane and bis(4-hydroxymethylcyclohexyl)-methane. The alcohol component may also consist in a mixture of several of the afore mentioned diols. If the short-chain ester units contain more than one alcohol component and/or acid component, at least 50 percent of the total number of short-chain ester units have to be identical.

Copolyesters, which are prepared from polyoxolane with terminal hydroxyl groups and a molecular weight of from 800 to 2,000, terephthalic acid, isophthalic acid and butanediol-(1,4), are especially suitable components (B) of the molding composition according to the invention.

The copolyesters used according to the invention are prepared as per known processes (cf. e.g. U.S. Pat. Nos. 3,023,192 and 3,651,014). The usual method is to heat to a temperature of from 150° to 260° C., in the presence of a catalyst, the dicarboxylic acid or the mixture of dicarboxylic acids which is present as dimethyl ester, together with a long-chain diol and an excess quantity of a short-chain diol. Particularly preferred catalysts are organic titanates, e.g. tetrabutyltitanate, optionally combined with magnesium acetate or calcium acetate. After having eliminated the methanol which had been formed by the ester exchange reaction and excessive reaction components—preferably by distillation—the elastomeric copolyester is obtained in a ready-for-use state.

The molding composition according to the invention is most usefully prepared by mixing the components, which are present preferably as powders or granules, and subsequent homogenization. Mixing is usually carried out at room temperature, preferably at a temperature of from 15° to 30° and the homogenization is performed in heatable mixing devices of any kind, e.g. drums, calenders, kneaders or extruders, at a temperature above the crystallite melting point of the oxymethylene polymer, i.e. at a temperature of from 150° to 250° C., preferably of from 170° to 220° C.; especially favorable is a temperature of from 175° to 200° C. Both components of the molding composition according to the invention must be suitable for processing within said temperature range. The molding composition according to the invention may optionally contain further additives, especially stabilizers and/or fillers as well as nucleating agents, antistatic agents, flame-retardant agents, lubricants and mold release agents, plasticizers, pigments, dyestuffs or brightening agents.

Especially suitable stabilizers against the influence of heat are polyamides, amides of polybasic carboxylic acids, amidines, e.g. dicyanodiamine, hydrazine, urea, poly(N-vinyl-lactams) and alcali earth metal salts of aliphatic, mono- to tribasic carboxylic acids—preferably containing hydroxyl groups—having from 2 to 20 carbon atoms, e.g. calcium stearate, calcium rizinoleate, calcium lactate and calcium citrate. As antioxidants are preferably used bisphenol compounds, especially diesters of monobasic 4-hydroxyphenyl alkane acids having from 7 to 13, preferably 7, 8 or 9 carbon atoms, with diols having from 2 to 6 carbon atoms. Suitable light stabilizers are α-hydroxybenzophenone-derivatives and derivatives of benzotriazole. The stabilizers are employed at a rate of totally from 0.1 to 5, preferably from 0.5 to 3 weight % (calculated on the total molding composition).

As fillers may be used, for example, asbestos fibers, glass fibers, glass powder, graphite, carbon black, metal powder, metal oxides, silicates, carbonates and molybdenum (IV)-sulfide. The quantity of the filler amounts to from 10 to 70, preferably from 20 to 40 weight % (calculated on the total molding composition).

The molding composition according to the invention may be crushed mechanically, e.g. by chopping or grinding, to yield granules, chips, flakes or powder. It is thermoplastic and is processed by injection molding, extrusion, spinning in the melt or deep drawing. It is a suitable material for the preparation of semi-finished articles and finished parts such as shaped articles, e.g. ribbons, rods, plates, films, tubes and hoses, as well as machine parts, e.g. casings, gear wheels, bearing parts and control units.

The following examples illustrate the invention:

EXAMPLES 1 to 5

2 kg each of a copolymer made of 98 weight % of trioxane and 2 weight % of ethylene oxide and containing primary alcohol terminal groups and having a RSV value of 0.73 dl.g$^{-1}$, a density of 1.42 g.cm$^{-3}$ and a crystallite melting point of 166° C. (component A) was blended with various quantities of a copolyester at a temperature of 20° C., and the blend was than homogenized in a single-screw-extruder at a temperature of 200° C. As copolyester was used a polymer which had been prepared of 390 parts by weight of dimethylterephthalate, 100 parts by weight of dimethylisophthalate, 195 parts by weight of butane-diol-(1,4) and 447 parts by weight of polyoxolane and which had a molecular weight of 1,000 (numerical average); the RSV value of the copolyester amounted to 2.78 dl.g$^{-1}$ (measured in a solution (at 1 weight %) of the copolyether in a mixture of 3 parts by weight of phenol and 2 parts by weight of carbon tetrachloride at a temperature of 25° C.) (component B). The residence time of the polyacetal/polyester mixture in the cylinder was about 4 minutes.

Shaped articles were manufactured on an injection molding machine from the molding composition obtained and submitted to tests of their tensile strength and impact strength. The tensile strength was determined by measuring the impact tensile strength according to DIN 53 448. The impact strength was determined on plates measuring 60×60×2 mm by means of a drop hammer test. Each plate to be tested was clamped on a frame and submitted to an impact (striking) strain in such a way that a drop hammer at the weight of 200 or 500 g, the contact part of which was shaped as hemisphere with a 2 cm diameter, was dropped vertically onto the plate from various heights, keeping the friction as low as possible. The height from where 50% of the plates were destroyed (average value out of 40 drop hammer tests) was the reference measure for the impact strength.

Table 1 shows the results obtained from the tests. A molding composition which does not contain a copolyester (Example (A) was indicated for comparison's sake.

TABLE 1

| Example | Molding composition components (wgt. %) A | Molding composition components (wgt. %) B | impact tensile strength (kgcm/cm$^2$) | drop height (cm) at a weight of the hammer of 200 g | drop height (cm) at a weight of the hammer of 500 g |
|---|---|---|---|---|---|
| A | 100 | — | 545 | 10 | <10 |
| 1 | 99 | 1 | 605 | 90 | 62 |
| 2 | 97.5 | 2.5 | 660 | 163 | 107 |
| 3 | 95 | 5 | 710 | 219 | 152 |
| 4 | 90 | 10 | 780 | >250 | 247 |
| 5 | 80 | 20 | 800 | >250 | >250 |

EXAMPLES 6 to 10

Molding compositions and shaped articles were prepared and tested according to examples 1 to 5, the component (A) used for these examples being made of 97 weight % of trioxane and 3 weight % of 1,3-dioxolane, which had primary alcohol terminal groups and a RSV value of 0.76 dl.g$^{-1}$, a density of 1.41 g.cm$^{-3}$ and a crystallite melting point of 167° C.

The results obtained from the test are shown in table 2. A molding composition which does not contain copolyester (Example (B) was indicated for comparison's sake.

TABLE 2

| Example | Components of the molding composition (weight %) A | B | impact tensile strength (kgcm/cm$^2$) | drop height (cm) at a weight of the hammer of 200 g | of 500 g |
|---|---|---|---|---|---|
| B | 100 | — | 550 | 10 | <10 |
| 6 | 99 | 1 | 605 | 86 | 60 |
| 7 | 97.5 | 2.5 | 660 | 161 | 103 |
| 8 | 95 | 5 | 720 | 215 | 158 |
| 9 | 90 | 10 | 785 | >250 | 250 |
| 10 | 80 | 20 | 800 | >250 | >250 |

EXAMPLES 11 to 14

Molding compositions and shaped articles were prepared and tested according to Examples 1 to 5. Component (A) used herefore was a copolymer made of 97.95 weight % of trioxane, 2 weight % of ethylene oxide and 0.05 weight % of butanediol-(1,4)-diglycidyl ether, having primary alcohol terminal groups and a RSV value of 0.90 dl.g$^{-1}$, a density of 1.42 g.cm$^{-3}$ and a crystallite melting point of 168° C. Component B) was a copolyester prepared from 585 parts by weight of dimethyl terephthalate, 240 parts by weight of butanediol-(1,4 and 370 parts by weight of polyoxolane having a molecular weight of 1,000 (numerical average); the RSV value of the copolyester was 2.31 dl.g$^{-1}$ (measured in analogy to examples 1 to 5).

The results obtained from the tests are shown in table 3. A molding composition which does not contain copolyester is indicated for comparison's sake (Example C).

TABLE 3

| Example | Components of the molding composition (weight %) A | B | impact tensile strength (kgcm/cm$^2$) | drop height (cm) at a weight of the hammer of 200 g |
|---|---|---|---|---|
| C | 100 | — | 620 | 12 |
| 11 | 99 | 1 | 660 | 15 |
| 12 | 97.5 | 2.5 | 690 | 19 |
| 13 | 95 | 5 | 730 | 25 |
| 14 | 90 | 10 | 770 | 83 |

EXAMPLES 15 to 18

Molding compositions and shaped articles were prepared and tested according to Examples 1 to 5. The molding compositions comprise, additionally to the components (A) and (B), calcium silicate as filler. Table 4 shows the test results obtained. Molding compositions which do not contain copolyester (Examples A and D) are indicated for comparison's sake.

TABLE 4

| Example | Components of molding composition (weight %) A | B | filler | drop height (cm) at a weight of the hammer of 200 g |
|---|---|---|---|---|
| A | 100 | — | — | 10 |
| D | 80 | — | 20 | <10 |
| 15 | 85.5 | 4.5 | 10 | 43 |
| 16 | 81 | 9 | 10 | 74 |
| 17 | 76 | 4 | 20 | 25 |
| 18 | 72 | 8 | 20 | 40 |

What is claimed is:
1. Molding composition consisting essentially of a mixture of
(A) from 99.9 to 50 weight % of an oxymethylene polymer which contains optionally from 0.1 to 20 weight % of oxyalkylene units having from 2 to 8 adjacent carbon atoms in the main chain, and
(B) from 0.1 to 50 weight % of a copolyester consisting of
(a) from 75 to 35 weight % of units of an ester of at least one aromatic dicarboxylic acid having a molecular weight of at most 300 and of a diol having a molecular weight of from 350 to 8,000; and
(b) from 25 to 65 weight % of units of an ester of at least one aromatic dicarboxylic acid having a molecular weight of at most 300 and of a diol having a molecular weight of at most 250.

2. Molding composition according to claim 1, wherein the oxymethylene polymer is a copolymer of trioxane and of a compound of the formula

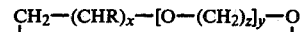

wherein R represents a hydrogen atom, an alkyl radical having from 1 to 6 carbon atoms, an alkoxymethyl radical having from 2 to 6 carbon atoms, a phenyl radical or a phenoxymethyl radical, x is 1, 2 or 3, y is 1, 2 or 3 with x being zero and z being 2 and z is 3, 4, 5 or 6 with x being zero and y being 1.

3. Molding composition according to claim 1 wherein the copolyester-forming dicarboxyic acid is an aromatic dicarboxylic acid having from 8 to 16 carbon atoms.

4. Molding composition according to claim 3 wherein the aromatic dicarboxylic acid is a phenylene-dicarboxylic acid.

5. Molding composition according to claim 1 wherein the copolyester-forming diol of a molecular weight of from 350 to 8,000 is a poly(alkylene oxide) diol, the alkylene group of which has from 3 to 8 carbon atoms.

6. Molding composition according to claim 1 wherein the copolyester-forming diol of a molecular weight of at most 250 is an aliphatic diol having from 2 to 15 carbon atoms.

7. Molding composition according to claim 6 wherein the aliphatic diol is butanediol-(1,4).

8. Process for the manufacture of a molding composition according to claim 1 which comprises that the components (A) and (B) each as a powder or a granule are mixed at room temperature and subsequently homogenized at a temperature above the crystallite melting point of component (A).

* * * * *